US006893148B1

(12) United States Patent
Blusseau et al.

(10) Patent No.: US 6,893,148 B1
(45) Date of Patent: May 17, 2005

(54) DUAL FUNCTION HEADLIGHT FOR A MOTOR VEHICLE WITH A SINGLE LIGHT SOURCE AND FIXED OPTICS

(75) Inventors: Eric Blusseau, Rueil-Malmaison (FR); Antoine De Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 09/557,835

(22) Filed: Apr. 26, 2000

(30) Foreign Application Priority Data

Apr. 29, 1999 (FR) .................................. 99 05454

(51) Int. Cl.$^{7}$ ............................ B60Q 1/04; F21V 7/00

(52) U.S. Cl. ...................... 362/518; 362/297; 362/346; 362/348

(58) Field of Search ............................... 362/518, 307, 362/348, 346, 297, 516

(56) References Cited

U.S. PATENT DOCUMENTS

| | | | | |
|---|---|---|---|---|
| 4,037,134 | A * | 7/1977 | Loper | 315/78 |
| 4,612,608 | A * | 9/1986 | Peitz | 362/297 |
| 4,803,601 | A | 2/1989 | Collot et al. | |
| 4,924,359 | A * | 5/1990 | Lindae et al. | 362/296 |
| 4,945,454 | A * | 7/1990 | Bunse et al. | 362/297 |
| 5,065,287 | A * | 11/1991 | Staiger et al. | 362/348 |
| 5,204,820 | A * | 4/1993 | Strobel et al. | 362/309 |
| 5,258,897 | A | 11/1993 | Nino | |
| 5,390,097 | A | 2/1995 | Nino | |
| 5,660,454 | A * | 8/1997 | Mori et al. | 362/318 |
| 5,707,129 | A * | 1/1998 | Kobayashi | 362/283 |
| 6,007,224 | A * | 12/1999 | Jiao et al. | 362/518 |
| 6,024,473 | A | 2/2000 | Fadel | |
| 6,409,369 | B1 * | 6/2002 | De Lamberterie | 362/518 |

FOREIGN PATENT DOCUMENTS

| | | |
|---|---|---|
| FR | 2564946 | 11/1985 |
| FR | 2675443 | 10/1992 |
| FR | 2706586 | 12/1994 |
| FR | 2609146 | 7/1998 |
| FR | 2760068 | 8/1998 |

OTHER PUBLICATIONS

French Search Report dated Dec. 17, 1999.

* cited by examiner

*Primary Examiner*—Thomas M. Sember
(74) *Attorney, Agent, or Firm*—Morgan & Finnegan, LLP

(57) ABSTRACT

A motor vehicle headlight has a light source cooperating with optical means to produce a beam which is generally spread widthwise. The optical means, such as a reflector, are adapted to produce in the beam two separate zones of maximum light intensity. The headlight gives two alternative functions, such as a short range lighting function for negotiating bends, and a foglight function, without the need for any movable optical components. The disclosure is also directed to a pair of vehicle lights so adapted, one on the right and one on the left of the vehicle.

11 Claims, 4 Drawing Sheets

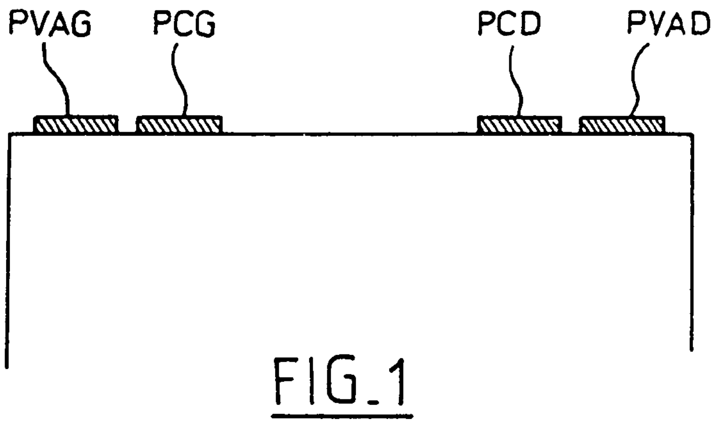
FIG_1
FIG_2
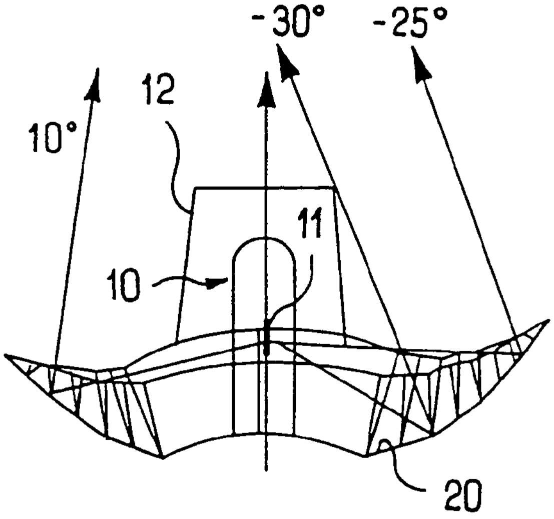
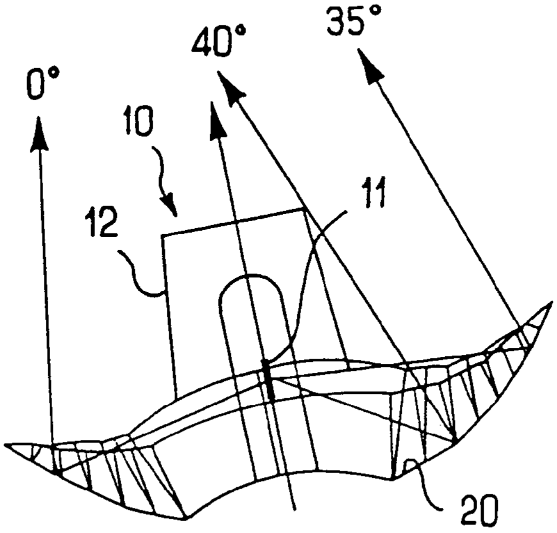
FIG_3

FIG_8
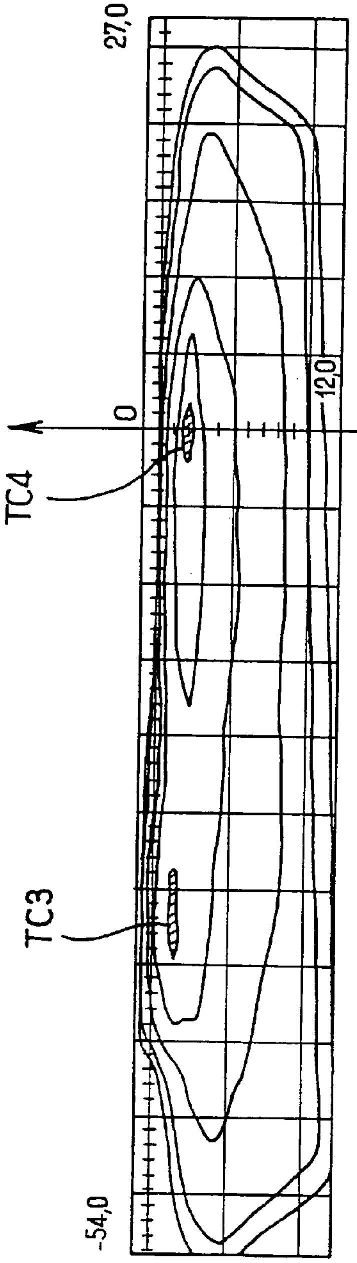
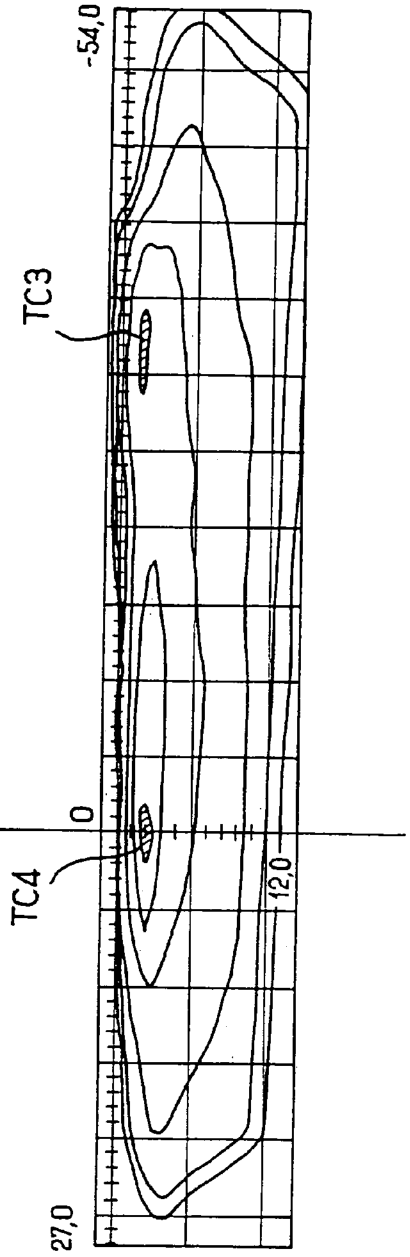
FIG_9

DUAL FUNCTION HEADLIGHT FOR A MOTOR VEHICLE WITH A SINGLE LIGHT SOURCE AND FIXED OPTICS

FIELD OF THE INVENTION

The present invention relates in general terms to motor vehicle lighting, and in particular to the additional headlights, or driving lights, which are often provided for the lateral enhancement of a passing or dipped headlight beam. These additional driving lights, which may also be referred to as turning lights, may at: the same time provide a fog penetrating or foglight function.

BACKGROUND OF THE INVENTION

There have previously been proposals for headlights which comprise a light source mounted in a reflector which is adapted to be tilted selectively between a first position and a second position. In the first position the light produces a beam which extends laterally a passing or dipped beam which is produced in parallel by a dedicated dipped beam headlight. In the second position, the headlight produces a beam which is suitably adapted for use in fog.

However, for various reasons, especially selling cost and reliability, it is in general preferred that headlights be defined in which the reflectors occupy a fixed position (apart of course from the facility for adjusting the horizontal and azimuth positions of the headlight during fitting or in operation in order to compensate for attitude variations of the vehicle). It will however be understood that recourse to such a fixed reflector is incompatible with known proposals for headlights combining the turning beam and foglight functions.

In addition, in the above mentioned headlights with tilting reflectors, having a common cover lens, it can be a somewhat difficult matter to design the reflector in such a way that it will produce both a satisfactory turning beam and a satisfactory beam for use in fog.

DISCUSSION OF THE INVENTION

An object of the present invention is to provide headlights for travel along both left hand and right hand bends in the road, which, firstly, enable a given beam to be enhanced effectively, for example extending a dipped beam sideways, in a given lateral direction, and which, secondly, can provide another type of beam in conformity with certain regulations, such as a foglight beam, and without in any way having to provide a movable optical component (typically the reflector) in the headlight, and with only one light source (typically a filament or discharge lamp) being provided.

According to the invention in a first aspect, a headlight for a motor vehicle, comprising a light source which cooperates with optical means to produce a beam which is generally spread widthwise, is characterized in that the optical means are adapted to create within the beam two distinct zones of maximum light intensity.

Various preferred features of the invention in its first aspect, which are however optional and not limiting, are as follows:

- the maximum light intensity zones is adapted to be situated substantially on the axis of the road;
- the two zones of maximum light intensity are offset angularly from each other by an angle of the order of 30 to 40°;

- the beam is defined by a generally horizontal cut-off line at the top of the beam;
- the cut-off line is essentially defined by two flat sections of the beam profile which are at different heights above the road, one of these flat sections being situated substantially in the axis of the road and being at a lower level than the other said flat section;
- the said optical means consists of a reflector which generates the beam directly from the light source;
- the left-hand and right-hand portions of the reflector produce zones of maximum light intensity which are situated on the right and left respectively within the beam.

According to the invention in a second aspect, the present invention provides a pair of headlights for a motor vehicle, consisting of a left-hand light and a right-hand light, characterized in that a first said light produces a first beam which is generally spread widthwise, with a first zone of maximum light intensity offset in a first lateral direction with respect to the axis of the road, and a second zone of maximum light intensity situated close to the axis of the road, and in that the other said light produces a second beam which is generally spread widthwise, with a first zone of maximum light intensity offset in a second lateral direction opposite to the first lateral direction with respect to the axis of the road, and a second zone of maximum light intensity situated close to the axis of the road.

Various preferred features of a pair of headlights according to this second aspect of the invention, which are however optional and not limiting, are as follows:

- each said headlight is adapted to be lit individually in accordance with curves in the road negotiated by the vehicle, and the two headlights are adapted to be lit simultaneously so as to cooperate to produce a common fog penetrating beam;
- each said headlight has a reflector which is adapted to form its beam directly, and the two headlights have identical reflectors which are tilted laterally in two opposite directions;
- each of the two said reflectors has a reflective surface which is symmetrical with respect to a vertical axial plane.

Further features, objects and advantages of the present invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 1 is a diagrammatic partial plan view showing left and right hand groups of lights at the front end of a vehicle.

FIG. 2 is a diagrammatic view in horizontal axial cross section, showing a lamp and a reflector of a headlight in a first embodiment of the invention.

FIG. 3 is a view similar to FIG. 2, in which the reflector and the lamp are tilted to one side.

FIGS. 8 and 9 show in greater detail the photometry of the same two beams as are shown in FIGS. 6 and 7, FIGS. 8 and 9 consisting of two respective sets of isolux curves.

DESCRIPTION OF PREFERRED EMBODIMENTS OF THE INVENTION

Figure 4:
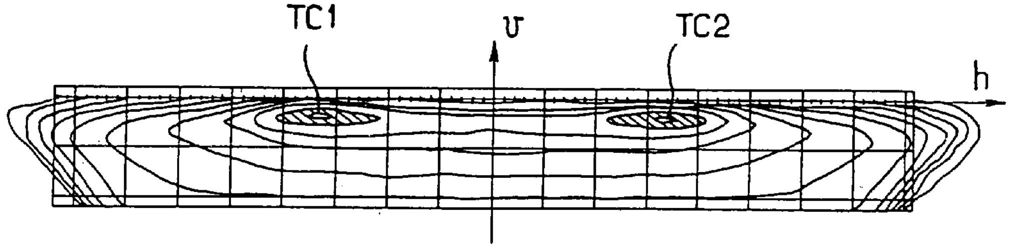
FIG. 4 is a set of isolux curves showing the appearance of the beam which is produced by a reflector of the type shown in FIGS. 2 and 3.

Reference is first made to FIG. 1, which indicates diagrammatically the front part of a motor vehicle which conventionally has two short-range (dipped beam) headlights, namely a left hand headlight PCG and a right hand headlight PCD. Each of these headlights is arranged to emit a turning (or dipped) beam of the asymmetrical normalised European type with a V-shaped cut-off. The light beams emitted by the two headlights are essentially such that they are superimposed on each other at infinity.

The vehicle also has two dual-function headlights, namely a left hand dual-function light PVAG and a right hand dual-function light PVAD. The two functions are those of a dipped beam, illuminating the verge of the road, and a foglight beam. These dual-function headlights will be described in greater detail later herein. There is also provision for a road illumination function, for example either by a pair of specific headlights or driving lights not shown, or in a manner incorporated in the cruising headlights, which are accordingly equipped for example with double filament lamps of the H4 normalized type or the like.

The dual-function headlights PVAG and PVAD, as will be seen in greater detail later herein, have fixed reflectors, but are adapted to perform a dipped beam function for left hand bends, a dipped beam function for right hand bends, and a foglight function. More precisely, and in accordance with one feature of the invention, it is arranged that the headlight PVAG is lit, either on a fully on/fully off basis or progressively, when the vehicle takes a left hand bend, the headlight PVAD being lit, again either on a fully on/fully off basis or progressively, when the vehicle takes a right hand bend; and bo th lights PVAG and PVAD are lit at the same time when a foglight function is required.

It will be observed here that such an approach enables the overall electrical consumption of the lighting system of the vehicle to be reduced. This is because, in normal operation, that is to say when the foglight function is not in use, only two lights are permanently lit; while no more than one additional light is lit when the vehicle is going round curves. The useful life of the lamps is also increased. This is by contrast with the situation in the prior art in which two short range dipped beam headlights, and two turning beam headlights with movable reflectors, or else a total of four lights, are permanently illuminated.

It will therefore be understood that the beams produced by these two headlights, which (as is shown) are fixed, must be able, when they are individually lit, effectively to enhance the cruising beam, or so-called main beam, on one side or the other of the beam; and they must also be able, when they are lit together, to satisfy the requirements for a fog penetrating beam, both as regards complying with regulations and as regards driver comfort. To this end, each of the two lights PVAG and PVAD is so designed as to produce a fixed beam which, firstly, is delimited by a generally horizontal top cut-off, and which secondly has two zones of maximum light intensity which are offset laterally with respect to each other.

For example, the beam emitted by the light PVAG may have a first zone of concentration in the axis of the road, that is to say with a zero lateral angular offset, and a second zone of concentration which is offset angularly, for example by about 35 to 40° to the left. Symmetrically, the beam emitted by the light PVAD has a first concentration zone in the axis of the road, and a second concentration zone which is offset to the right by about 35 to 40°.

Thus, each beam, by virtue of its second concentration zone, can perform a satisfactory dipped beam function. At the same time, when both headlights are lit, the superposition of the two beams on each other produces a total beam which has a horizontal cut-off and which has, in the axis of the road, a sufficiently high light intensity to constitute a good anti-fog beam, while at the same time it is of substantial width below the cut-off line.

The beams described above may be produced either by a judicious combination of a reflective mirror and light-deflecting elements arranged on a closure lens of the headlight, or essentially by a specific design of the reflector. In this latter case, it can be of advantage to make use of the arrangements described in French published patent specifications FR 2 760 067A and FR 2 760 068A in the name of the Company Valeo Vision, to which reference should be made for greater detail. It may however be recollected here that those documents describe reflective surfaces which are based on different zones that are capable of individually generating portions of the beam which are delimited by respective cut-off lines, and on which it is possible to vary in a very flexible manner the widthwise distributions.

Having regard to the fact that the concentration zone which is dedicated to the dipped beam function is offset by a substantial amount with respect to the optical axis of the reflector, it can be of advantage to design the reflector in such a way that it produces a first concentration zone which is offset to one side with respect to the axis, and a second concentration zone which is offset on the opposite side of the axis.

Thus, FIG. 2, to which reference is now made, shows a reflector 20 which cooperates with a lamp 10 having a filament 11 and completed by a mask or occulter 12 for blocking direct light, the reflective surface of which is so designed that its left hand portion produces a concentration zone at about 10° to the right, and so that its right hand portion produces a concentration zone at about 25 to 30° to the left.

This being so, the lateral spreads called for during design of the reflector remain within reasonable limits, and in particular, the occurrence of undesirable interruptions of the reflected light either by the occulter 12 itself, or by areas (not shown) which are such as to extend the reflector forward, is avoided. These undesirable occultations are also avoided because of the use of the left hand portion of the reflector to give the right hand deviation of light, and its right hand portion to give deviation to the left. This characteristic also enables a reflector to be made which is either more closed around the light source than in the case in which the left and right hand portions of the reflector were dedicated to deviations to the left and right respectively, and therefore to obtaining a better recuperation of light flux emitted by the light source.

It will be understood that it is then sufficient to turn the assembly consisting of the lamp and reflector through 10° to the left in order to obtain the required separation of the concentration zones, as is shown in FIG. 3, to which reference is made.

It will of course be understood that the assembly consisting of the lamp and reflector of the headlight PVAD is preferably designed to be symmetrical.

In another version of this embodiment, it is possible to design a single reflector which can be used at will either in the light PVAG or in the light PVAD. More precisely, if, on the basis of the principles described above, a reflector is produced which generates a generally symmetrical beam of the kind shown in FIG. 4, to which reference is now made, having a first concentration zone TC1 which is offset by about 17.5° to the left, and a second concentration zone TC2 which is offset by about 17.5° to the right, this same reflector can then be used, tilted through about 17.5° to the left in the left hand light and tilted by about 17.5° to the right in the right hand light, in order to produce the respective left and right beams described above.

It may be observed that an approach of this kind enables problems of passing round the mask 12 to be overcome even better, given that these problems do increase to the extent that the left and right deviations called for in the design of the reflector increase.

Figure 5:
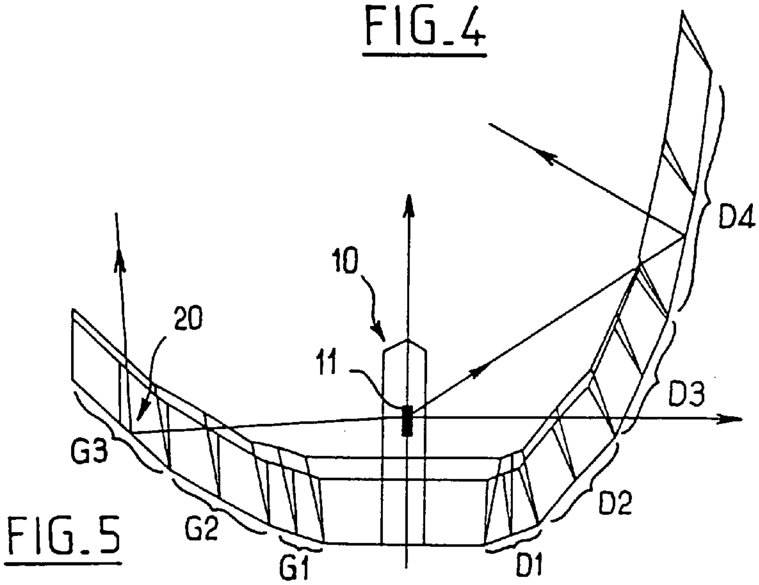
FIG. 5 is a diagrammatic view in horizontal axial cross section, showing a lamp and a reflector of a headlight in a second embodiment of the invention.

Reference is now made to FIG. 5, which shows diagrammatically the design of a further reflector for a headlight PVAG in accordance with the invention, which enables a beam to be produced which is suitable at the same time, in the manner explained above, for the dipped beam function and the foglight function, and which has the advantageous feature that it is delimited at the top by two cut-off portions C1 and C2 which are offset in height from each other.

Here again, the arrangements disclosed in the above mentioned French patent specifications Nos. FR 2 760 067A and FR 2 760 068A can be used with advantage, making use of individual reflective zones, the reflective cut-off lines of which are judiciously offset from each other in height, although such a version is in no way limiting. Thus, in the example shown in FIG. 5, there can be arranged in the left hand part of the reflector three zones G1, G2 and G3 which give rise to portions of the beam which are delimited by a cut-off line C1 which can be placed, at, for example, 2% below the horizon, which corresponds to current regulations; while in the right hand part of the reflector there are four zones D1, D2, D3 and D4 which give rise to portions of the beam that are delimited by a cut-off line C2 which is situated at, for example, 1.5% above the other cut-off line, that is to say at 0.5% below the horizon. It is of course possible, in another version, to provide for progressive variations in the height of the cut-off line as between one zone and the other.

Figure 6:
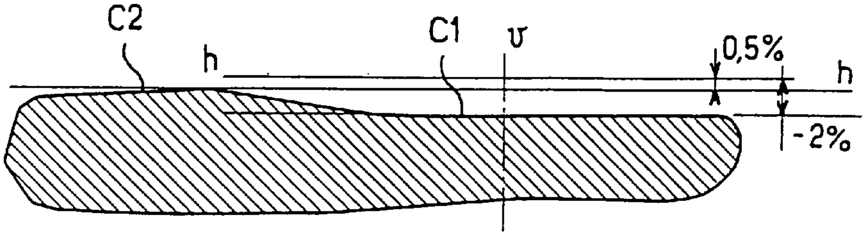
FIGS. 6 and 7 show the contours of the respective light beams produced by two headlights designed as a pair, symmetrically with each other, these headlights having reflectors as in FIG. 5.

FIG. 6 shows the contour of the beam produced by such a reflector. As to FIG. 7, this shows the contour of the beam produced by the reflector of the headlight PVAD, which is designed symmetrically with the headlight PVAG. Such a beam enables the dipped beam function to be improved, in that, with this function, the amount of light which laterally extends the dipped passing beam will be situated at a correct height with respect to the height of the passing beam. In the foglight function, on the other hand, the central region of the foglight beam will be raised above the horizon by a sufficient amount (typically 2% in the example under consideration) to produce satisfactory fog penetration.

Figure 7:
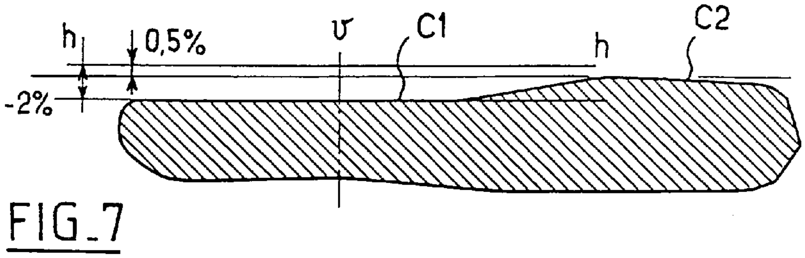

Beams such as those shown in FIGS. 6 and 7 may or may not have two concentration zones in the manner described above. In the case where these two concentration zones are provided, the photometry of the two beams may for example be as shown in FIGS. 8 and 9, to which reference is now made. It will be noticed in these Figures that the concentration zone TC3 which is offset to one side and which contributes to the dipped beam function, is of a relatively pointed form, and that the same is true for the concentration zone TC4 which lies essentially on the axis of the road and which contributes to the foglight function.

Figure 10:
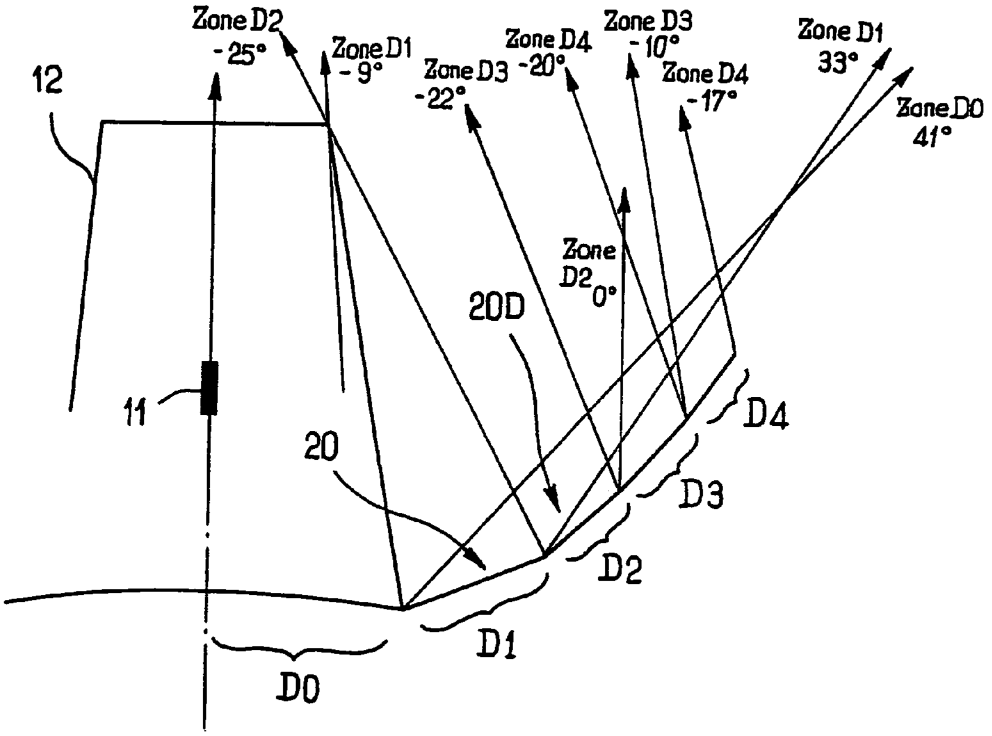
FIG. 10 is a diagrammatic view in horizontal axial cross section of a lamp and a reflector, illustrating in greater detail one example of a reflector of the general kind shown in FIG. 5.

Reference is now made to FIG. 10, which shows another embodiment of the design of a reflector incorporating features of the invention. In this reflector, one half of the latter, being a lateral half which in this example is the right hand half, is able to play a part not only in the formation of the zone of concentration of light in the beam that is offset to the left, but also to reinforce the light, with a substantial spread, towards the right. The purpose of this is to reduce even more the above mentioned problems of passing round the mask 12.

Thus, in FIG. 10, this right hand half 20D of the reflector comprises, going from the inside towards the outside, a first zone or base zone D0 which gives a spread of light between 0° and 41° to the right, a second zone D1 which provides a spread between 9° to the left and 30° to the right, a third zone D2 which provides a spread between 25° to the left and 0°, a fourth zone D3 which gives a relatively concentrated distribution between 22° and 10° to the left, and finally a fifth zone D4 which provides a very concentrated distribution between 20° and 70° to the left.

It will be understood th at it is the outermost zone D4 that plays the greatest part in creating the concentration zone offset to the left, while the zone D3 enables this concentration zone to be well based in the rest of the beam.

The present invention is of course in no way limited to the embodiments described above and shown in the drawings, but a person skilled in this particular technical field will be able to make numerous variations and modifications to it. In particular, all of the photometric characteristics indicated in the foregoing may be ensured either by the reflector alone, or by the reflector in cooperation with an appropriate lens. Finally, the various features can also be obtained in some cases with headlights of the so-called elliptical type, which are well known in the vehicle illumination field.

What is claimed is:

1. A headlight for a motor vehicle, for travel along a road defining an axis of the road which is the general direction of travel of the vehicle, the headlight comprising a light source and optical reflector adjacent to the light source for producing a beam which is generally spread widthwise with respect to the axis of the road, wherein said optical reflector has a continuous reflective surface that creates in said beam at least two distinct zones of maximum light intensities, wherein said optical reflector has a central axis passing through the light source in the beam direction, and is asymmetrical along a plane on the central axis so said distinct zones have different angular offsets with at least one distinct zone located on the outer edge of said reflective surface.

2. A headlight according to claim 1, wherein the said optical reflector is adapted to put one of the said zones of maximum light intensity substantially in the axis of the road.

3. A headlight according to claim 1, wherein the two said zones of maximum light intensity are offset angularly from each other by an amount in the range 30 to 40°.

4. A headlight according to claim 1, defining a beam profile in which the beam is defined by a generally horizontal cut-off line at the top of the beam.

5. A headlight according to claim 4, defining a beam profile in which the said cut-off line consists essentially of two substantially horizontal straight sections disposed at different heights, wherein a first said section is substantially in the axis of the road and is lower than the other said section.

6. A headlight according to claim 1, wherein the optical reflector produces said beam directly from the light source.

7. A headlight according to claim 6, wherein the reflector comprises a left hand portion and a right hand portion, for producing said zones of maximum light intensity situated on the right and left hand sides respectively in the beam.

8. A pair of headlights for a motor vehicle for travel along a road defining an axis of the road such that travel of the vehicle is substantially along the axis of the road, the said pair of headlights comprising a left hand light and a right hand light, wherein a first one of the said lights is adapted to produce a first beam generally spread widthwise with respect to the axis of the road and having a first zone of maximum light intensity offset from the axis of the road in a first lateral direction and a second zone of maximum light intensity situated close to the axis of the road, and the other said light is adapted to produce a second beam generally spread widthwise and having a fist zone of maximum light intensity offset from the axis of the road in a second lateral direction opposite to the said first lateral direction and a second zone of maximum light intensity situated close to the axis of the road, wherein each said light includes an optical reflector with a continuous reflective surface that has a central axis passing through the light source in the beam direction, and is asymmetrical along a plane on the central axis so the first and second zones have different angular offsets with at least one of said zones located on the outer edge of said reflective surface.

9. A pair of headlights according to claim 8, wherein each said headlight is adapted to be lit individually according to bends in the axis of the road negotiated by the vehicle, and wherein both headlights are adapted to be lit simultaneously to produce jointly a fog penetrating beam.

10. A pair of headlights according to claim 8, wherein said reflector is adapted to form its beam directly from the light source, and wherein the two headlights include reflectors identical with each other but tilted laterally in two opposite directions.

11. A pair of headlights according to claim 10, each defining a vertical axial plane, wherein each said reflector has a reflective surface which is symmetrical with respect to the said vertical axial plane of that headlight.

* * * * *